United States Patent [19]

Theodossi et al.

[11] 4,089,923
[45] May 16, 1978

[54] MANUFACTURE OF SUBMARINE CABLE

[75] Inventors: Charalambos Georgiou Theodossi, San Diego; David Arthur Hibbs, Chula Vista, both of Calif.

[73] Assignee: International Telephone & Telegraph Corporation, New York, N.Y.

[21] Appl. No.: 769,569

[22] Filed: Feb. 17, 1977

[51] Int. Cl.² .................................................. B29F 3/10
[52] U.S. Cl. ................................... 264/146; 156/244.24; 264/163; 264/174; 264/237; 425/113
[58] Field of Search ................. 264/174, 173, 237, 90, 264/138, 163, 162, 146; 156/244, 51, 55, 56; 425/113

[56] References Cited

U.S. PATENT DOCUMENTS

| | | | |
|---|---|---|---|
| 2,384,224 | 9/1945 | Williams | 264/174 |
| 2,731,069 | 1/1956 | Horn | 264/174 |
| 2,820,987 | 1/1958 | Bunch | 264/174 |
| 2,904,846 | 9/1959 | Smith | 264/174 |
| 3,290,995 | 12/1966 | Pull | 264/162 |
| 3,356,790 | 12/1967 | Polizzano et al. | 156/55 |
| 3,849,192 | 11/1974 | Schmidt | 264/237 |

Primary Examiner—Jeffery R. Thurlow
Attorney, Agent, or Firm—Thomas L. Peterson

[57] ABSTRACT

In the manufacture of submarine coaxial cable, the dielectric sizing process is performed immediately after and in tandem with dielectric extrusion and cooling processes so that a portion of the water-rich surface layer of the dielectric resulting from the cooling process will be removed before the water has time to permeate into the inner regions of the dielectric.

6 Claims, 1 Drawing Figure

U.S. Patent
May 16, 1978
4,089,923
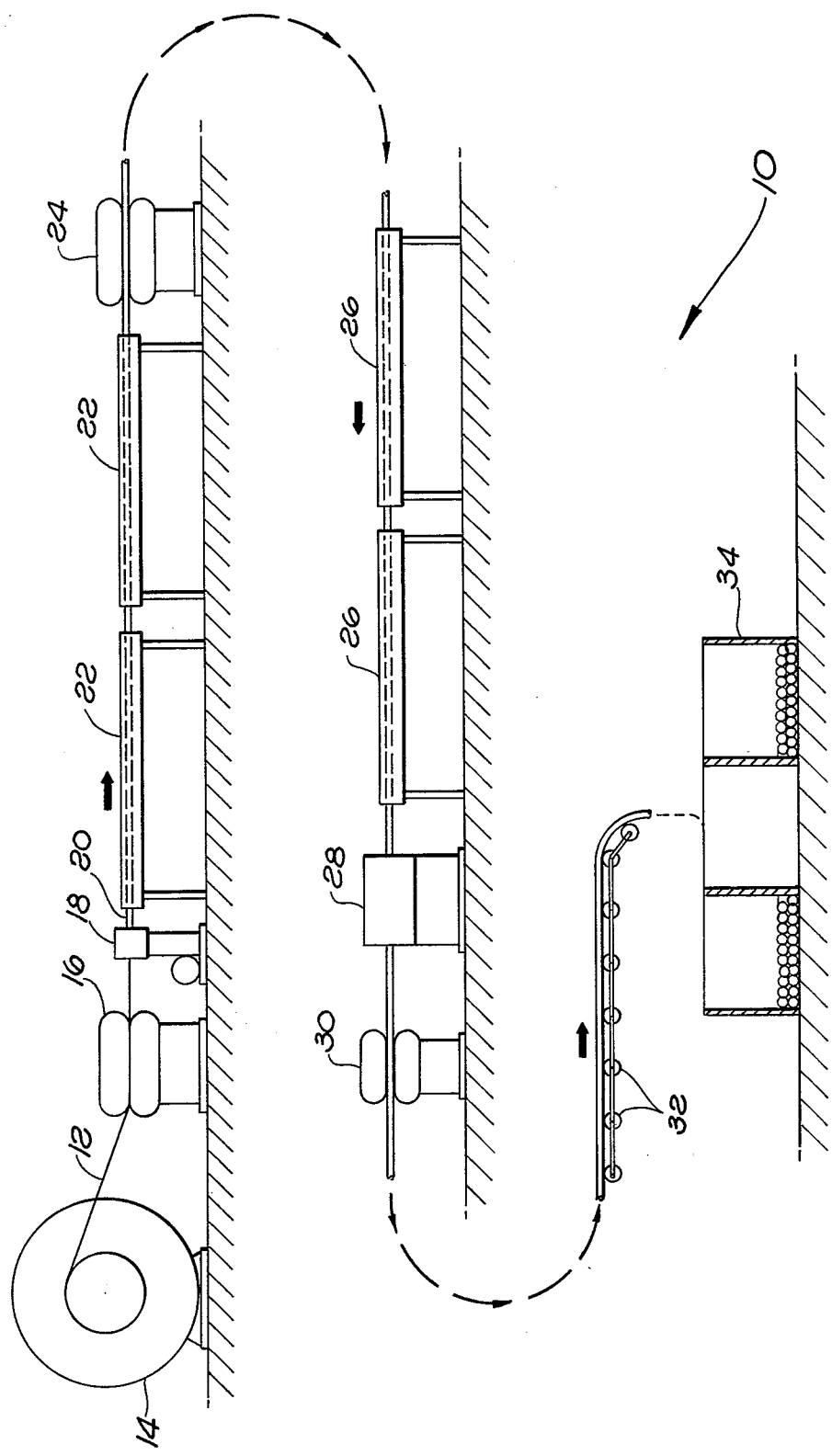

MANUFACTURE OF SUBMARINE CABLE

BACKGROUND OF THE INVENTION

The present invention relates to the manufacture of submarine coaxial cable and, more particularly, to an improved method and apparatus for manufacturing submarine coaxial cable so as to reduce the total water content of the dielectric of the cable.

It is normal practice in the manufacture of submarine coaxial cable to extrude a dielectric, typically polyethelene, around the center conductor or core of the cable and cool the dielectric by passing the dielectric covered core through troughs of water in one operation and subsequently store the cable in a temperature-controlled room until the dielectric temperature and size is stabilized. Due to the precise transmission characteristics demanded from submarine coaxial cables, it is the practice to extrude the dielectric diameter oversize and subsequently size the dielectric by a separate operation to close diameter tolerances. The sizing operation is executed as a separate process which takes place after the temporary storage of the dielectric covered core in a temperature-controlled room. It will be appreciated that this process requires the use of additional facilities and labor to store the long lengths of cable being fed into and out of the extrusion and sizing equipment.

The dielectric sizing is achieved by a multiplicity of cutters rotated around the dielectric at high speed while the cable dielectric is pulled axially through the cutter assembly. This method achieves precise diameter control and results in a layer of dielectric of approximately 0.020 inch average thickness being removed from around the dielectric surface. Alternatively, the cable sizing can be achieved by a multiplicity of fixed or rotating cutting dies placed in a tandem manner along the cable. The cutting orifices of the dies are arranged to produce sequentially reducing diameters so that the thickness of material removed at each cutting stage is controlled.

Special low-loss grades of polyethylene have been developed for use in submarine cable. These have a dielectric loss in the order of 47 microradians at the designed top transmission frequency of the cable which is 30 MHz. Even lower loss materials are in the course of development for cables planned to operate at transmission frequencies up to 200 MHz.

Problems have been experienced in the use of these materials where the fabricated cable has exhibited excessive attenuation due to an increase in the dielectric loss of the polyethylene. This excess loss is due to the permeation of water into the polyethylene during the cooling process which takes place immediately after the extrusion of the polyethylene. The highest concentration of absorbed water is in the outer most 0.10 inch layer of the dielectric, decreasing amounts being present in the underlying areas of the dielectric toward the cable center conductor or core. Expressed in other terms, approximately 25% of the water content of the dielectric material is contained within the top 5% of the material thickness.

Subsequent to the extrusion and sizing processes, the water moves in the polyethylene dielectric, travelling both toward the cable center conductor and to the atmosphere from the sized cable surface. The result of the water movement is that the concentration of water content tends to become more evenly dispersed over the cross-section of the dielectric with time while the total quantity of absorbed water decreases. Also, as a consequence of the extrusion processing speed which is within the range of 10 to 20 feet per minute and the reverse order sizing operation which is processed within the range of 25 to 35 feet per minute, it can be appreciated that the residence time in storage over a 10-nm length cable results in the fact that one end of the cable length will experience between 3 to 6 days difference in storage time over which the dispersion of absorbed water in the polyethylene can take place. A minimum period of 14 days is therefore required to produce an acceptable uniformity of water content and, therefore, electrical characteristics of the cable over the cable length.

Obviously, there is a practical limit to the time the cable dielectric core can be left in storage after sizing to dissipate water prior to application of the impermeable outer conductor and the outer jacket of the cable. This is due to the excessive storage space that would be required to hold the cable in storage for a period in excess of 14 days. It would, therefore, be highly advantageous to avoid the lengthy storage presently required of the cable dielectric core which is necessitated by the permeation of water into the dielectric.

It is the purpose of the present invention to reduce the total water content of the dielectric cable to minimize dielectric loss, and to provide uniformity of the electrical characteristics of the cable throughout its length.

SUMMARY OF THE INVENTION

According to the principal aspect of the present invention, the cable dielectric sizing process is performed immediately after and in tandem with the dielectric extrusion and cooling processes so that a portion of the water-rich surface of the dielectric resulting from the cooling process will be removed before the water has time to permeate into the inner regions of the dielectric. By reducing the total water content of the dielectric by this means, the adverse effect of water absorbtion on the dielectric loss of the dielectric will be minimized. Also, by the use of a tandem dielectric sizing process, the labor costs associated with the temporary storage of the cable prior to a separate sizing process, as presently used, will be saved, thus resulting in a more efficient overall manufacturing procedure. Further, by dispensing with the intermediate storage space required to store extruded cable before the sizing operation in the presently used process, more storage space may be made available for the conditioning of the core in the sized condition when more efficient dissipation of absorbed water can take place.

BRIEF DESCRIPTION OF THE DRAWING

The drawing illustrates schematically an apparatus for extruding and sizing submarine coaxial cable in accordance with the present invention.

DESCRIPTION OF THE PREFERRED EMBODIMENT

According to the invention, rather than temporarily storing the extruded and cooled dielectric core and thereafter sizing the core in a separate operation, the dielectric sizing equipment is incorporated into the extrusion process line immediately after the cooling troughs so that a large percentage of the water-rich dielectric surface can be removed before the water permeates into the interior of the dielectric. As a consequence, the total water content of the core will be reduced after storage. Since approximately 25% of the water content of the dielectric material is contained within the top 5% of the material thickness, preferably the sizing equipment is set to remove approximately 5% of the dielectric thickness. As a minimum, the sizing operation should remove at least 3% of the dielectric thickness to avoid appreciable permeation of water from the outer region of the dielectric into the inner region thereof. It will be appreciated that removal of greater amounts of the outer layer of the dielectric will result in wasted material and higher costs, although total water content of the core would be reduced.

Reference is made to the drawing which illustrates the apparatus of the present invention, generally designated 10. The center conductor or core 12 of the cable to be insulated is paid off from a rotating pay-off drum 14 and through a constant speed metering device 16. From there, the conductor is lead through the die head of an extruder 18 wherein the conductor receives a thick layer of dielectric, preferably polyethylene, heated to a molten formable state. The insulated conductor 20 is then led through a multiplicity of cooling troughs 22 filled with water or any other suitable cooling liquid. The water is maintained at a series of predetermined temperatures consistent with stress-free cooling of the dielectric. The cooling liquid may or may not be held at pressures above ambient atmospheric pressure in order to suppress the formation of voids in the dielectric. After a predetermined length of cooling trough, the cable is passed through a pulling device 24 which applies a constant tension over the cable back to the metering device 16 to keep the insulated core 20 at a predetermined catenary profile within the extruder die and cooling troughs.

The cooling dielectric is then passed through a series of final cooling troughs 26 filled with liquid at ambient temperatures and then into sizing equipment 28. The sizing equipment may incorporate a multiplicity of cutters (not shown) rotated around the dielectric at high speed while the cable is pulled axially through the cutter assembly. Alternatively, the sizing equipment may comprise a multiplicity of fixed or rotating dies placed in a tandem manner along the cable.

The sized cable passes through a further pulling device 30 arranged to pull the cable at constant tension. The cable is then fed along a multiplicity of rollers 32 to a storage area 34 where the completed cable dielectric is stored at a controlled temperature. Thus, it is seen that the sizing equipment 28 immediately follows the extrusion and cooling equipment, and is in tandem therewith, so that it may remove the outer layer of the dielectric immediately following the drawing of the dielectric core from the cooling troughs 26. Since the dielectric sizing process takes place immediately after and in tandem with the extrusion and cooling processes, the water-rich surface layer of the dielectric is removed before the water has time to permeate into the inner regions of the dielectric. As a consequence, the total water content of the dielectric, and the adverse effect of water absorbtion on the dielectric loss of the dielectric, is minimized. Further, by the tandem dielectric sizing technique of the present invention, the labor costs associated with storage of the cable during the operation of a separate sizing process as presently used is saved, thus resulting in a more efficient overall manufacture of cable. Furthermore, by dispensing with the intermediate storage space required to store extruded cable before the sizing operation, more storage space will be made available for the conditioning of the core in the sized condition when more efficient dissipation of absorbed water can take place. In addition, because the intermediate coiling operation between the extrusion and sizing processes are eliminated by the present invention, the direction of the cable processing flow is not reversed and, therefore, dissipation of absorbed water takes place uniformly throughout the cable. Therefore, the electrical characteristics of the cable are generally uniform throughout its length.

What is claimed is:

1. In a method of manufacturing a submarine coaxial cable, the steps comprising:
    extruding a dielectric around the center conductor for the cable;
    cooling in a liquid the dielectric covering on the center conductor to a stabilized profile; and
    thereafter sizing the dielectric covering to remove the outer layer thereof contacted by the cooling liquid prior to appreciable permeation of cooling liquid from the outer region of the dielectric into the inner region thereof.

2. A method of manufacturing a submarine coaxial cable as set forth in claim 1 wherein:
    said sizing removes at least 3% of the dielectric thickness.

3. A method of manufacturing a submarine coaxial cable as set forth in claim 1 wherein:
    said sizing removes about 5% of the dielectric thickness.

4. In a method of manufacturing a submarine coaxial cable, the steps comprising:
    extruding a dielectric around the center conductor for the cable;
    passing the dielectric covered center conductor through a cooling liquid; and
    removing the outer layer of the dielectric covering contacted by the cooling liquid immediately after and in tandem with the extrusion and cooling steps.

5. An apparatus for manufacturing submarine coaxial cable comprising:
    means for extruding a dielectric around the center conductor for the cable;
    means for cooling the dielectric covered center conductor as it emerges from said extrusion means, said cooling means including a receptacle for containing a cooling liquid;
    dielectric sizing means separate from but in tandem with said extrusion means and said cooling means for removing the outer layer of the dielectric; and
    means for drawing the center conductor through said extrusion means, cooling means and sizing means in sequence.

6. An apparatus for manufacturing submarine coaxial cable as set forth in claim 5 wherein:
    said center conductor drawing means includes a haul-off device between said cooling means and said sizing means.

* * * * *